United States Patent [19]

Freeman

[11] Patent Number: 4,764,409
[45] Date of Patent: Aug. 16, 1988

[54] METALLIC REINFORCEMENTS FOR USE IN FIBER STRUCTURES

[75] Inventor: Richard B. Freeman, Wilmington, Del.

[73] Assignee: The Budd Company, Troy, Mich.

[21] Appl. No.: 946,477

[22] Filed: Dec. 24, 1986

[51] Int. Cl.[4] ............................................. B32B 3/06
[52] U.S. Cl. ..................................... 428/98; 428/100; 428/119; 428/192; 428/285; 52/309.16
[58] Field of Search ................. 428/98, 100, 119, 192, 428/285; 52/309.16, 716; 24/563; 248/903; 403/265, 267

[56] References Cited

U.S. PATENT DOCUMENTS

| | | | |
|---|---|---|---|
| 1,856,030 | 4/1932 | Loeffler | 52/DIG. 6 |
| 1,915,611 | 6/1933 | Miller | 161/111 |
| 2,100,415 | 11/1937 | Theodorsen | 52/715 |
| 3,197,821 | 8/1965 | Bright | 52/716 |
| 3,476,634 | 11/1969 | Fleischmann | 428/139 |

FOREIGN PATENT DOCUMENTS 1111939 11/1960 France .................................. 24/563

Primary Examiner—John E. Kittle
Assistant Examiner—Beth A. Bozzelli
Attorney, Agent, or Firm—E. M. Farrell; Herman Foster; T. I. Davenport

[57] ABSTRACT

A fiber reinforced structure formed by layers of fiber having a metallic reinforcement element disposed therebetween. The metallic element includes bent portions or fingers formed at the edges thereof, which extend toward the outer surfaces of the layers of fiber. The fiber layers and metallic element are held in place by resin injected during a molding process. The bent portions of the metallic element bridge the inner plane surfaces of the layers of fiber to strengthen the areas at the resin plane where stress areas normally causes the layers of fiber to separate.

5 Claims, 2 Drawing Sheets

METALLIC REINFORCEMENTS FOR USE IN FIBER STRUCTURES

BACKGROUND OF THE INVENTION

Resin transfer molding has been disclosed in a number of publications and patents including, for example, U.S. Pat. Nos. 4,568,057 and 4,608,453 both issued to Richard B. Freeman. The latter patent discloses metallic elements acting as a shield disposed between layers of fiber.

Generally, when a fiberglass structure is formed using the resin transfer molding process, the fiber material is disposed in a mold including upper and lower mold pieces. With the fiber material between the mold, resin is injected into the fiber material while the fiber material is under heat and pressure. After the resin has been injected the formed fiber product is allowed to cool.

Fiberglass structures have been used recently in the development of many automotive components including, for example, doors. In cases involving automotive doors, metal inserts or reinforcements must be used to provide strong structures, to permit the connection thereto of such items as door handles, hinges and other components which must be mounted to the door after the doors have been initially formed.

In the formation of the automotive component, for example, layers of fiber are employed which are impregnated with resin. When metal inserts or reinforcements are disposed between the layers, concentration will exist at the edges of the metal insert which tend to lead to inter-laminar shear failure. With a resin molded structure, the metal reinforcement is generally placed into the mold along with dry unimpregnated fiber reinforcement. When one of the configurations of a metallic reinforcements of the present invention is used, the potential inter-laminar shear failure is prevented or minimized.

OBJECTS OF THE INVENTION

It is an object of this invention to provide an improved metal insert which may be used in a fiber reinforced structure formed by a resin transfer molding process.

It is still a further object of this invention to provide an improved metal insert in a fiber reinforced structure in which the inter-laminar shear failure between the layers of fiber used is minimized.

It is still a further object of this invention to provide an improved metal insert which bridges a potentially weak resin plane normally existing between the layers of fiber in the resin transfer molding process.

BRIEF SUMMARY OF THE INVENTION

In accordance with the present invention, a fiber reinforced structure includes layers of fiber having a metal reinforcement element disposed there-between. The metal element includes bent portions or fingers formed in the edges of the metal element, which extend toward the outer surfaces of the adjacent layers of fiber. The bent portions of the metal serve to bridge the inner plane surfaces of the layers of fiber to strengthen the resin area plane at the edges of the metal element where stress concentration tend to build up.

Other objects and advantages of the present invention will be apparent and suggest themselves to those skilled in the art, from a reading of the following specification and claims, taken in conjunction with the accompanying drawings.

DESCRIPTION OF THE INVENTION

Figure 1:
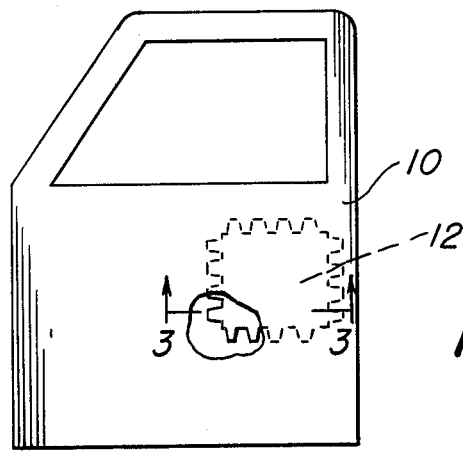
FIG. 1 illustrates an automotive door having a metal insert therein, in accordance with the present invention.
Figure 2:
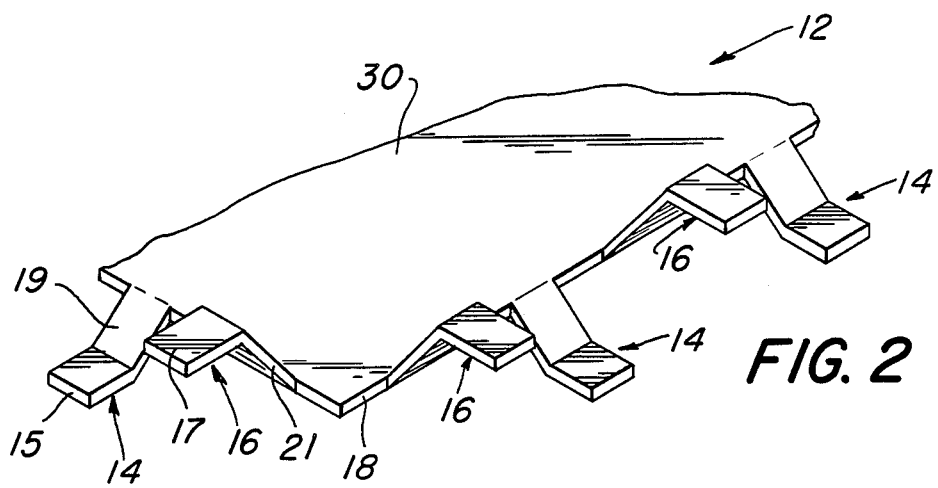
FIG. 2 is an enlarged isometric view illustrating a portion of the metal insert illustrated in FIG. 1.
Figure 3:
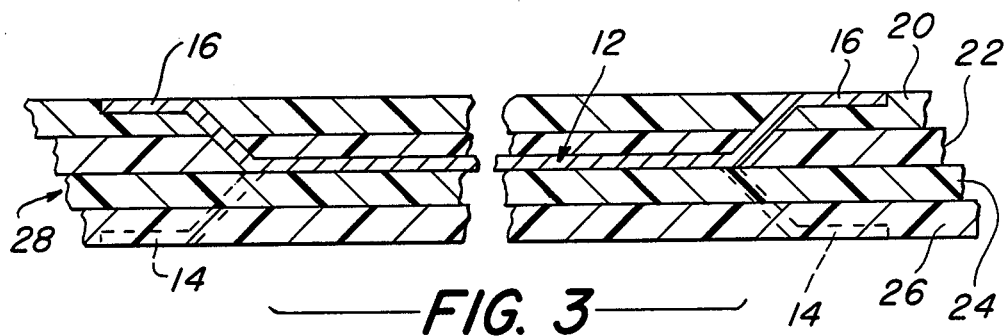
FIG. 3 is a cross-sectional view taken along line 3—3 of FIG. 1.

Referring to FIGS. 1, 2 and 3, a fiber reinforced structure comprises a door 10 having a metal insert 12 imbedded therein. The metal insert 12 provides a relatively strong element to permit various hardware to be attached to the door. This hardware may include the handles and hinges for the door, for example. While the fiber structure is relatively strong, it is generally not suitable to directly receive hardware thereon, thereby necessitating the need for reinforcement of some type.

As illustrated in FIG. 2, the metal insert or reinforcement 12 includes a plurality of projecting fingers or bent portions 14 and 16 extending from the peripheral edge 18 of the metal insert 12.

As illustrated in FIG. 3, the fiber structure comprising the door 10 is made up of a plurality of layers of fiber reinforced material 20, 22, 24 and 26. Four layers are illustrated, it being understood that two layers or more than four may also be used in the present invention. The metal insert 12 is disposed between 2 of the layers 22 and 24 with the oppositely projecting fingers 14 and 16 being projected into the upper layers 20 and 22 and the lower layers 24 and 26.

The various elements illustrated in FIG. 3 are generally placed in a mold having upper and lower pieces which are disposed to hold in place the structure illustrated in FIG. 3 during the injection of the resin. The final formed structure 28, for example, includes the fiberglass material and the metal insert 12 in place between the molds (not illustrated in FIG. 3) as resin is injected to impregnate the layer of fiber 20, 22, 24 and 26 and to bond to the metal insert 12. After the layers of fiber have been impregnated, curing and cooling periods take place, after which the formed structure is removed from the mold. The part formed may be the door 10 illustrated in FIG. 1.

Figure 4:
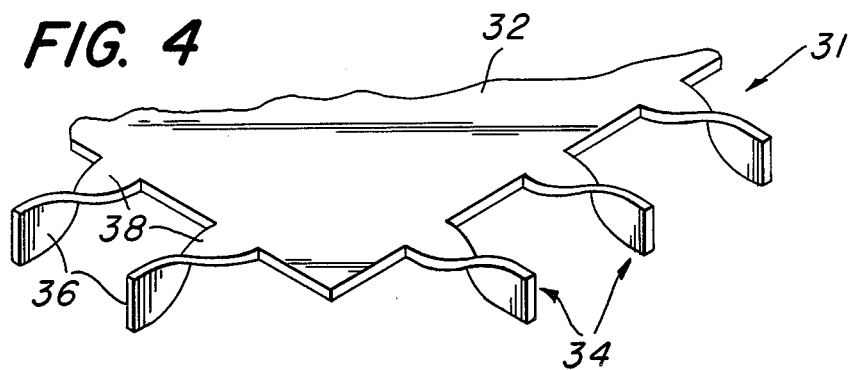
FIGS. 4 and 5 illustrate different embodiments of the metal insert in accordance with the present invention.
Figure 5:
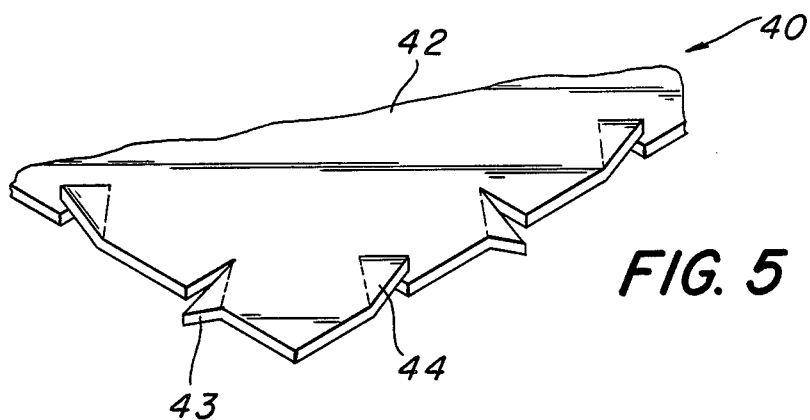

The metal piece 12 includes various oppositely projecting portions which may take a variety of different forms, such as illustrated in FIGS. 2, 4 and 5. The particular shape of the projecting portions at the edges of the metal piece is dependent upon the particular design requirements.

FIG. 2 illustrates the projecting portions 14 and 16 as including end sections 15 and 17, respectively, which are parallel with the main body 30 of the metal insert 12. Angularly disposed connecting portions 19 and 21 lead from the main body of the metal insert 12 to the end portions 15 and 17 of the bent portions or fingers 16.

The main portion 30 of the metal insert 12 may be considered as being in the same plane of the resin between the layers 22 and 24. This is the plane at which shear stress concentrations tend to build up, the resin tends to be weak in shear and tend to cause adjoining layers of fiber to separate. The metal reinforcement 12 tends to minimize the likihood of the fiber layers separating.

The fingers formed at the edges of the metallic reinforcement 12 predetermined heights above and below the main metal surface depending upon the actual reinforcement layers, typically the fingers through one or more layers in each direction.

The narrowness of the bent portions or fingers allow them to intertwine with the dry reinforcement of the fiber layers, thus bridging the potentially weak resin plane between two reinforcement layers. After the resin is pumped through the fibers reinforcement and cured, a composite structure will be defined, one which contains a local metallic reinforcement but with a minimal stress concentration. In some cases, even when the metallic reinforcement is brought to the surface of the part being formed for direct contact with the attached hardware, the fingers will still provide structural integrity for the structure.

Referring to FIG. 4, the metallic insert 31 comprises a main portion 32 having twisted projecting fingers or portions 34 extending from the edges of the main body 32. In this embodiment, the end portions 36 are perpendicular to the main portion 32, the connecting portions 38 starting in the same plane as the main portion 32. The twisted fingers 34 twisted 90 degrees from the plane of the surface 32 extends through adjacent layers fiber to provide the same advantages as that described in connection with the metal insert illustrated in FIGS. 1, 2 and 3.

Referring to FIG. 5, a metal insert 40 includes a main portion 42 having fingers 43 and 44 therefrom. In this embodiment, fingers include a single bend running in opposite directions from the main flat body 42. Again, the metal insert 42 fingers offer the advantages of passing thru adjacent layers of the fiberglass material thereby minimizing the concentrations at the end of the metal insert thereby minimizing the likihood of separation of the layers after formation.

Figure 6:
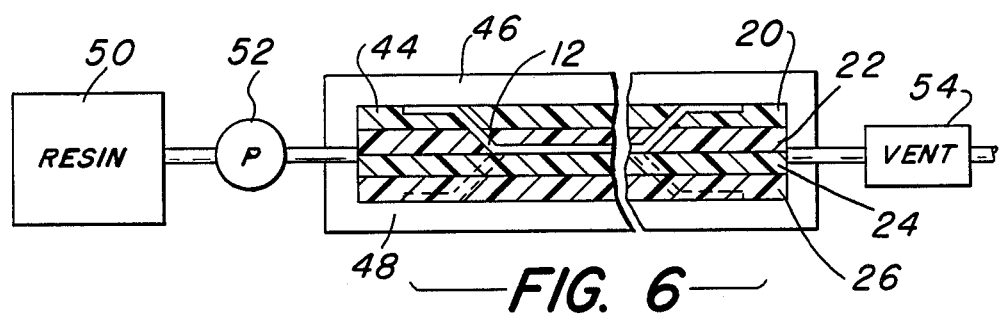
FIG. 6 is a schematic view illustrating an over-all resin transfer molding system, in accordance with the present invention.

Referring to FIG. 6, there is illustrated a structure 44, (illustrated as door 12 in FIG. 1), disposed within a mold having upper piece 46 and lower piece 48. The metal insert 12 is disposed between fiber layers 22 and 24. The projecting fingers extending into upper fiber layers 20 and 22, lower layers 24 and 26. After the layers of fiber and metal insert is inserted in place in the mold, the mold pieces 46 and 48 are closed. Resin is pumped from a source 50, a pump 52 into the fiber layers 20, 22, 24 and 26. A vent 54 is provided to receive air from the fiberous material as the resin is being injected.

The present invention has provided means for strengthening the over-all fiber structure in areas where the resin is injected between fibrous layers. The resin planes between the fibrous layers tend to be the weak areas in the structure formed. The metal insert with the projecting fingers extending through the layers of fiber tend to minimize or strengthen the areas in the resin plane.

What is claimed is:

1. A fiber reinforced structure formed by a resin injection molding process comprising:
  a. a plurality of layers of fibrous material impregnated with resin;
  b. a flat metal reinforcement element having a flat central surface area with bent portions around the edges thereof disposed between and bonded to oppositely disposed layers of fibrous material;
  c. said metal element including a plurality of bent portions formed in the edges of said metal element extending in opposite directions through said oppositely disposed layers and into additional layers of fibrous material on both sides of said reinforcement element, and
  d. whereby said bent portions of said metal element bridge the inner plane surfaces of said layers of fibrous material to minimize stress concentration at the edges of said metal reinforcement element.

2. A fiber reinforced structure as set forth in claim 1 wherein alternate ones of said plurality of bent portions extend in opposite directions.

3. A fiber reinforced structure as set forth in claim 2 wherein said bent portions include twisted sections at right angles to the plane of said flat central surface area.

4. A fiber reinforced structure as set forth in claim 2 wherein said bent portions include parallel sections parallel to said flat central surface area and angular intermediate sections extending from said flat central surface area to said parallel sections.

5. A fiber reinforced structure as set forth in claim 2 wherein said bent portions extend angularly from said flat central surface area and include pointed end sections.

* * * * *